United States Patent
Hall (10) Patent No.: US 10,475,419 B2
(45) Date of Patent: Nov. 12, 2019

(54) DATA COMPRESSION METHOD AND APPARATUS

(71) Applicant: DISPLAYLINK (UK) LIMITED, Cambridge (GB)

(72) Inventor: Trevor Hall, Middlesex (GB)

(73) Assignee: DISPLAYLINK (UK) LIMITED, Cambridge (GB)

( * ) Notice: Subject to any disclaimer, the term of this patent is extended or adjusted under 35 U.S.C. 154(b) by 0 days.

(21) Appl. No.: 15/768,518

(22) PCT Filed: Nov. 8, 2016

(86) PCT No.: PCT/GB2016/053493
§ 371 (c)(1),
(2) Date: Apr. 13, 2018

(87) PCT Pub. No.: WO2017/085462
PCT Pub. Date: May 26, 2017

(65) Prior Publication Data
US 2018/0308458 A1    Oct. 25, 2018

(30) Foreign Application Priority Data
Nov. 16, 2015 (GB) .................................. 1520167.6

(51) Int. Cl.
*G09G 5/391* (2006.01)
*H04N 19/186* (2014.01)
(Continued)

(52) U.S. Cl.
CPC ........... *G09G 5/391* (2013.01); *H04N 19/124* (2014.11); *H04N 19/137* (2014.11);
(Continued)

(58) Field of Classification Search
CPC .................................................... G06F 1/3265
See application file for complete search history.

(56) References Cited

U.S. PATENT DOCUMENTS

| 2002/0015041 | A1* | 2/2002 | Naegle | G06F 7/509 345/501 |
| 2003/0039398 | A1* | 2/2003 | McIntyre | H04N 21/234309 382/239 |
| 2003/0112863 | A1* | 6/2003 | Demos | G06T 3/4015 375/240.01 |
| 2004/0010803 | A1* | 1/2004 | Berstis | H04N 5/23206 725/105 |

(Continued)

FOREIGN PATENT DOCUMENTS

| EP | 2809073 | 12/2014 |
| JP | 2011041190 | 2/2011 |
| WO | WO 03/007126 | 1/2003 |

*Primary Examiner* — Daniel F Hajnik
(74) *Attorney, Agent, or Firm* — Haynes and Boone, LLP (57) ABSTRACT

A method of compressing image data involves determining an active area of an image to be displayed, at least part of which changes from frame to frame to provide a moving image. Color values for each pixel in at least part of the active area that has changed are determined (S73) and a resolution of a blue component of the color values is dynamically reduced (S75) relative to resolutions of green and red components of the color values. The image data is then transmitted, together with error correction information indicating how to correct the blue component when the image data is displayed. The active area may be a particularly fast changing part of the image or an area on which a user is focused.

22 Claims, 8 Drawing Sheets

(51) Int. Cl.
*H04N 19/167* (2014.01)
*H04N 19/98* (2014.01)
*H04N 19/124* (2014.01)
*H04N 19/137* (2014.01)
*H04N 19/146* (2014.01)
*H04N 19/156* (2014.01)

(52) U.S. Cl.
CPC ......... *H04N 19/146* (2014.11); *H04N 19/156* (2014.11); *H04N 19/167* (2014.11); *H04N 19/186* (2014.11); *H04N 19/98* (2014.11); *G09G 2350/00* (2013.01)

(56) References Cited

U.S. PATENT DOCUMENTS

| | | | |
|---|---|---|---|
| 2006/0250525 A1* | 11/2006 | Plut | G06F 1/3203 348/607 |
| 2007/0274382 A1* | 11/2007 | Hickey | H03M 7/40 375/240.03 |
| 2009/0102857 A1* | 4/2009 | Kallio | G06T 11/40 345/611 |
| 2012/0051666 A1* | 3/2012 | Minakawa | G06T 3/0018 382/295 |
| 2015/0042659 A1 | 2/2015 | Holland et al. | |
| 2015/0043655 A1 | 2/2015 | Nilsson | |
| 2015/0348493 A1* | 12/2015 | Chae | G09G 5/00 345/212 |

\* cited by examiner

DATA COMPRESSION METHOD AND APPARATUS

CROSS-REFERENCE TO RELATED APPLICATIONS

This application is a U.S. national stage application under 35 U.S.C. § 371 of International Patent Application No. PCT/GB2016/053493, filed on Nov. 8, 2016, which claims the benefit of Great Britain Patent Application No. 1520167.6 filed on Nov. 16, 2015, the contents of each of which are incorporated herein by reference in their entirety.

BACKGROUND

When graphical image data is produced by a computing device, or host, it is commonly produced in pixels comprising values for the levels of red (R), green (G), and blue (B). This is known as RGB. The pixel data can then be transmitted as separate R, G, and B values, or more usually, the pixel data can be converted to luma (Y) and chroma (a, β) values where luma indicates the luminescence of the pixel and chroma indicates its colour.

Luma is calculated as follows:

$$Y=k(R+G+B)$$

Where k is a constant to appropriately scale the Y value

The two chroma values comprise parts of the original RGB value as follows:

$$\alpha=aR+bG+cB$$

$$\beta=a'R+b'G+c'B$$

where a, b, c and a', b' and c' are constants. A simple transform often used makes a=0, b=1, c=1 and a'=1, b'=1, c'=0, resulting in:

$$\alpha=G+B$$

$$\beta=G+R$$

The constants are always pre-programmed and are not changed to adapt to different circumstances. Naturally, this leads to a preponderance of green, which is corrected using, so-called, gamma correction that takes place before the pixels are displayed on a screen.

There are other standard transforms for different colour spaces available by which the balance of the RGB values can be set by constant weightings before they are coded into the luma and chroma values, although this method is the most common in conventional use. As mentioned above, these constants are pre-programmed for specific fixed colour spaces and are not changed to adapt to different circumstances. In any case, conversion back into RGB relies on the use of a known colour space in which the constants used are not changed.

SUMMARY OF THE INVENTION

According to a first aspect, the invention provides a method of compressing image data, the method comprising:
  determining an active area forming at least a portion of an image to be displayed, wherein the active area comprises a frame of image data, at least part of which changes from frame to frame at a frame rate to provide a moving image;
  for a frame of image data:
  determining colour values for each pixel in the frame;
  dynamically reducing a resolution of a blue component of the colour values relative to resolutions of green and red components of the colour values; and
  transmitting the image data, together with error correction information indicating how to correct the blue component for the frame when the image data is displayed.

In a preferred embodiment, an amount of reduction of the resolution of the blue component is based on the frame rate, which may be compared to one or more threshold rates and the resolution of the blue component is preferably reduced by one or more amounts based on whether the frame rate exceeds one or more particular threshold rates. Preferably, the resolution of the blue component is not reduced when the frame rate drops below a predetermined threshold rate in order to allow the displayed image to be healed.

According to a second aspect, the invention provides a method of compressing image data, the method comprising:
  determining an active area forming at least a portion of an image to be displayed, wherein the active area comprises a frame of image data, at least part of which changes from frame to frame to provide a moving image;
  for a frame of image data:
  determining at least one segment of the image data that has changed from a previous frame to form at least part of the moving image in the frame;
  determining colour values for each pixel in the frame;
  dynamically reducing a resolution of a blue component of the colour values relative to resolutions of green and red components of the colour values for each pixel in the determined at least one segment; and
  transmitting the image data, together with error correction information indicating how to correct the blue component for the frame when the image data is displayed.

In a preferred embodiment, the amount of reduction of the resolution of the blue component is based on the amount of change of the image data in the at least one segment, which may be compared to one or more thresholds and the resolution of the blue component is reduced by one or more amounts based on whether the amount of change exceeds one or more particular thresholds. Preferably, the resolution of the blue component is not reduced when the amount of change drops below a predetermined threshold in order to allow the displayed image to be healed.

According to a third aspect, the invention provides a method of compressing image data, the method comprising:
  determining an active area of an image comprising a plurality of tiles of image data, the active area being less than the whole of the image and being an area on which a user is focussed;
  for at least one tile of image data not in the active area:
  determining colour values in a colour space for each pixel in the tile;
  dynamically reducing a resolution of a blue component of the colour values relative to resolutions of green and red components of the colour values; and
  transmitting the image data, together with error correction information indicating how to restore the blue component for the tile when the image data is displayed.

In one embodiment, the active area is determined by sensing a direction of focus of an eye of the user. In a preferred embodiment, the amount of reduction of the resolution of the blue component is based on the distance of the tile from the active area, which may be compared to one or more thresholds and the resolution of the blue component reduced by one or more amounts based on whether the distance exceeds one or more particular thresholds. Preferably, the resolution of the blue component is not reduced when the distance drops below a predetermined threshold in order to allow the displayed image to be healed.

In one embodiment, the method further comprises determining a value of a system parameter, and wherein an amount of reduction of the resolution of the blue component is based on the value of the system parameter. Preferably, the value of the system parameter is compared to one or more thresholds and the resolution of the blue component is reduced by one or more amounts based on whether the value of the system parameter is below or above one or more particular thresholds. The resolution of the blue component may not be reduced when the value of the system parameter is below or above a predetermined threshold in order to allow the displayed image to be healed. The system parameter may be any one or more of available bandwidth within the system, processor load, processor temperature or available battery power.

Preferably, reducing the resolution of the blue component comprises dynamically selecting a reduction factor and reducing the resolution of the blue component based on the reduction factor, wherein the error correction information includes the reduction factor.

Reducing the resolution of the blue component preferably comprises reducing a number of levels of blue gradations of the blue component. The colour space may be an RGB colour space and the colour values are R, G and B colour values, or the colour space may be a luma/chroma colour space, which may be the YUV, Y'UV, Y'IQ, YDbDr, YPbPr, Y'CbCr colour spaces or any derivative of any of thereof, including the Extended-gamut YCC digital video color space standard published as IEC 61966-2-4, and the ITU BT.601, BT.709 and BT.2020 standards.

Preferably, dynamically reducing the resolution of the blue component for each pixel comprises altering weighting factors for each colour value in the colour space. In an embodiment, altering weighting factors comprises weighting the colour value of the blue component to reduce the blue component relative to the red and green components so that it requires fewer bits compared to the red and green components. If desired, the resolution of the blue component may not be reduced periodically in order to allow the displayed image to be healed.

The method may further comprise compressing the image data comprising the colour values, wherein transmitting the image data comprises transmitting the compressed image data. Preferably, dynamically reducing the resolution of the blue component of the colour values relative to resolutions of green and red components of the colour values may be performed during the compressing the image data. Dynamically reducing the resolution of the blue component of the colour values relative to resolutions of green and red components of the colour values may comprise selecting a higher quantisation factor for the blue component than quantisation factors selected for the red and green components.

Some aspects of the invention may be beneficial because they allow the system to take advantage of the reduced sensitivity of the human eye to blue colour by dropping some blue colour information when required, thus improving compression with minimal impact on user experience.

Preferably, the method is triggered by information regarding the performance of a transmission method between the host and the device, such as bandwidth or speed of a connection. For example, where a significant amount of data is being transmitted and bandwidth is limited, the resolution of the chroma values of image data may be reduced to a greater extent than under normal use conditions.

The method may lead to loss of colour depth and resolution, which will cause bleeding of colours. However, if the data being transmitted is fast-moving, as is likely to be the case where the method is triggered by information regarding the performance of transmission as described above, this will not be visible. Current-art systems trade off against image quality, but this is more likely to be visible to the user; the method of the invention retains image sharpness because the luma values are likely to be unaffected.

A reduction in resolution of the blue component effectively reduces the number of levels of blue gradations, or shades, that are available, thereby leading to "posterisation" of the blue component. Thus, for example, if the "normal" resolution of each of the colours is provided by 8 bits, this leads to a quantisation of 256 levels, where 0 is full dark and full blue intensity is 255. A reduced resolution may only use 4 bits, allowing only 16 quantised levels to be used, where 0 is full dark and 15 will be full blue intensity. Thus, in this embodiment, the compressed data then needs to be corrected when the image is to be displayed by multiplying the reduced resolution by 16 to bring it up to 8 bits so that full blue intensity will again be at 255, even though the number of levels will be still be reduced.

Due to the potential loss of colour depth and resolution, however, it is preferably possible to 'heal' an image as the performance of transmission improves, by sending data that has been reduced in resolution to a lesser degree. This will mean that over time the colour bleeding caused by the loss of resolution will disappear, improving user experience.

Preferably, different chroma values may be reduced in resolution by separate degrees. This will further fine-tune the method to take advantage of the colour resolution of the human eye, which is commonly less sensitive to blue than other colours, especially at the focal point.

Advantageously, further fine-tuning of the method may be performed using data regarding the location of the user's focus on the display device. This is advantageous because the human eye perceives blue colours more accurately and green and red less accurately in peripheral vision while the reverse is true for focal vision. As a result, it may be advantageous to weight the different colours appropriately in order to further reduce data being transmitted without negatively affecting user experience.

BRIEF DESCRIPTION OF THE DRAWINGS

Embodiments of the invention will now be more fully described, by way of example, with reference to the drawings, of which.

DETAILED DESCRIPTION OF THE DRAWINGS

Figure 1:
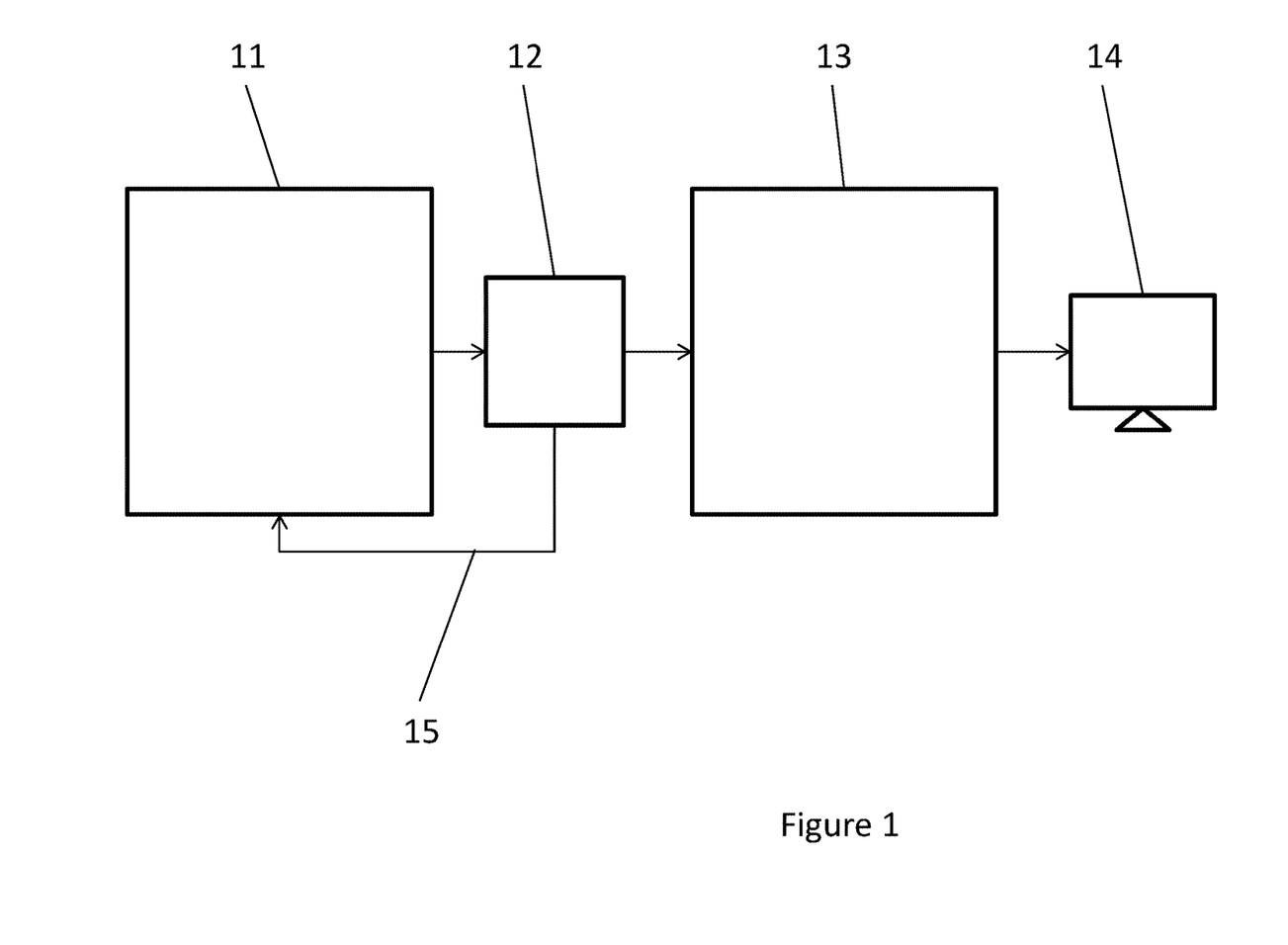
FIG. 1 is a general diagram of a system in which embodiments of the invention may be used.

FIG. 1 shows a host [11], which may be a static computer or a mobile device such as a laptop, tablet computer, smartphone or smart watch. It is connected to a display control device [13] via, in this embodiment, a USB connection [12]. The USB connection [12] has sufficient intelligence to provide feedback [15] to the host [11] regarding bandwidth availability and connection speed or any other appropriate metric of performance. This feedback [15] could be obtained from the connection [12], as here, or from the display control device [13] or another source such as within the host [11]. Alternatively, it may be additionally transmitted to the display control device [13] and used as a direct indication of alterations made to the display data. As another alternative, it may not be used at all and weighting may be applied on a different basis. The display control device [13] is in turn connected to a display device [14]. This may be a conventional monitor, a projector, a television, or even a portable display device such as a heads-up display.

In other embodiments, the display control device [13] may be part of the host [11] or the display device [14], i.e. contained within the same casing and connected directly to the device or devices with which it is co-located. For example, in a single device with an integral display, the host [11], display control device [13] and display device [14] may all appear to be a single device. In this embodiment, however, the display control device [13] is a separate device provided in a docking station to which the host [11] and the display device [14] are connected.

The methods of the invention are especially useful where some trait of the connection [12] between the host [11] and the display control device [13] is likely to vary. For example, bandwidth is a term describing the maximum data transfer rate of a connection, i.e. the amount of data that can be sent over that connection in a given time period. However, the maximum bandwidth in a connection may not be available, for example due to existing data traffic. Because the data being sent through a connection may vary, the bandwidth available may also vary. In this embodiment, the feedback [15] from the USB connection [12] may be an indication of available bandwidth as sampled from time to time. Embodiments of the invention can therefore be applied to a greater or lesser extent or in a different way depending on the bandwidth available in the connection [12]: if there is little bandwidth available, the resolution of the blue component of colour data may be reduced to a significant degree, but as more bandwidth becomes available, for example because less image data is being transmitted or it is being updated at a slower rate, the resolution of the blue component may be reduced to a lesser degree and the image 'healed' as it is returned to a higher colour quality.

This benefit also applies to any other trait of the connection [12] which may vary over time.

In this embodiment, the display device [14] is connected to the display control device [13] via a display-specific connection using protocols such as VGA, HDMI, DVI, FireWire or similar protocols.

Although in this embodiment all connections are wired, some or all of them may instead be wireless through a medium such as Wi-Fi or Bluetooth, or even via a network, including the Internet.

Figure 2:
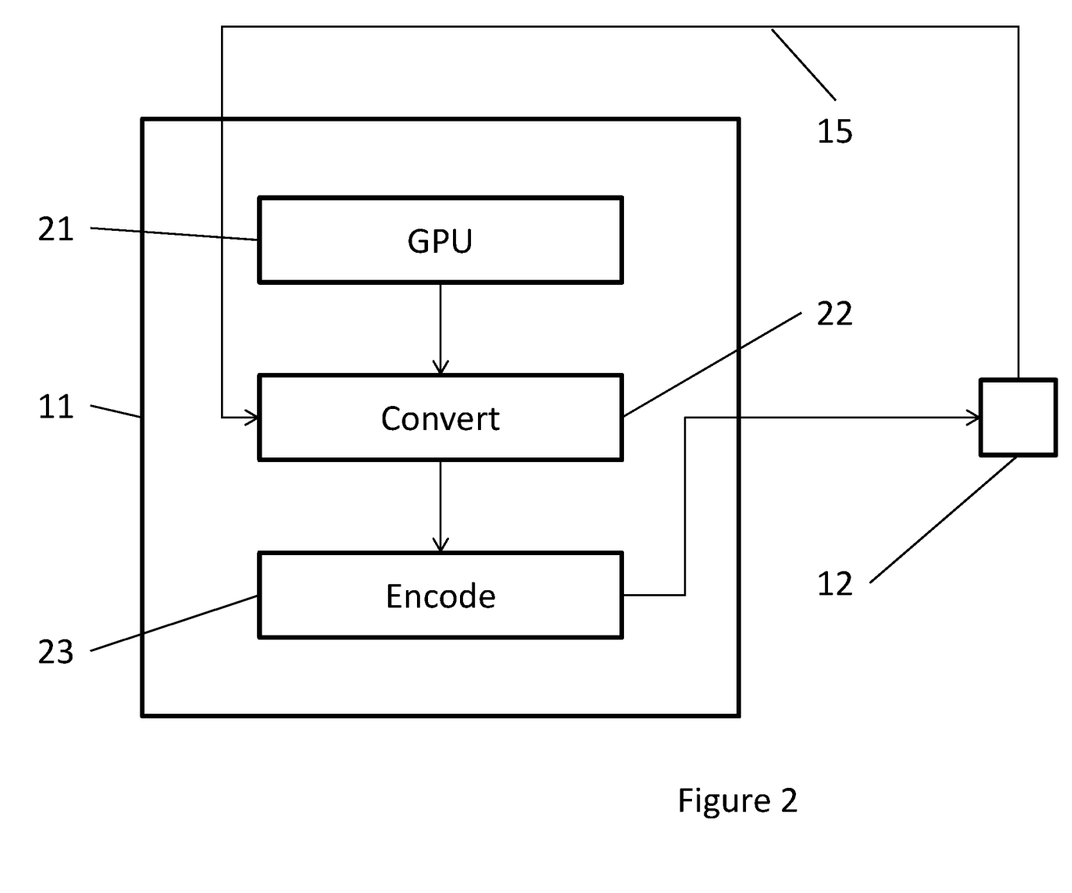
FIG. 2 is a simplified schematic of a host device.

FIG. 2 shows a detail of the host [11], showing internal processing components [21, 22, 23] that handle the image data. These may be embodied in software, firmware, hardware, or any combination of these or other types of embodiment as appropriate. There will, of course, be other components, but since these are immaterial to the invention they are not shown. The first component [21] is a graphical generator which produces image data in RGB pixel format. This is likely to be contained in the graphics processing unit (GPU) on the host [11]. It is connected to a conversion unit [22] which processes the RGB data to produce luma and chroma values as previously described. This unit [22] receives feedback [15], in this embodiment from the USB connection [12] as previously described, which allows it to alter the weighting applied to different elements of the luma and chroma values dynamically in order to change the volume of data that needs to be encoded and transmitted to the display control device [13]. This feedback [15] may be received and used to alter the weighting of the relative resolutions of different colours on a frame-by-frame basis such that the blue component in each frame may have a different resolution relative to the resolutions of the red and green components as compared to the preceding frame, depending on the requirements of the connection. This is different to conventional systems, in which this feedback [15] does not exist and the weighting cannot be changed. For example, if it is found that the frame rate of the image is high, i.e. that the image is a fast moving video, the amount of blue reduction may be higher, since it will be less noticeable to the viewer, than for a slower frame rate.

The conversion unit [22] is finally connected to an encoder [23], which encodes the luma and chroma values along with the weighting information produced by the conversion unit [22] as appropriate. In this embodiment, the weighting information will change the relative importance of the colour components, so that the blue component is weighted to be of lower importance so that its resolution can be reduced compared to the resolutions of the red and green components. Thus, for example, the red and green components may be weighted as 1 each and the blue component as $\frac{1}{16}$ so that the red and green components would have all 8 bits, meaning that they are fine grained, having values 0, 1, 2, 3, . . . 255, whereas the blue component would only have 4 bits, giving only 16 possible levels of values 0, 1, 2, 3, . . . 15. These 4 bit values would then need to be multiplied by the inverse of the weighting (i.e. 16) at the output to give values 0, 16, 32, 64 . . . 255. Thus, the term weighting provides the concept of relative importance and also the quantisation (where quantisation means division by value, and truncation to an integer). For coding and transmission, these then need to be multiplied prior to display to restore the output levels. This is generically known as error correction information.

The encoded data can then be transmitted to the display control device [13] and for this purpose the encoder [23] is connected to the USB connection [12]. There may in fact be a further engine which handles this connection, for example by converting the data to packets as required by the USB standard, but this is considered part of the USB connection [12] for the purpose of this description. The error correction information must always be transmitted as metadata along with the encoded display data, as it will be required for correction to be performed correctly.

Although the connections between the components [21, 22, 23] are shown as single arrows, multiple types of data may be sent between each component [21, 22, 23]. For example, as previously mentioned, the conversion engine [22] produces luma, chroma, and error correction information. These may be sent to the encoder [23] over a single line as shown here, or over separate signalling connections.

Figure 3:
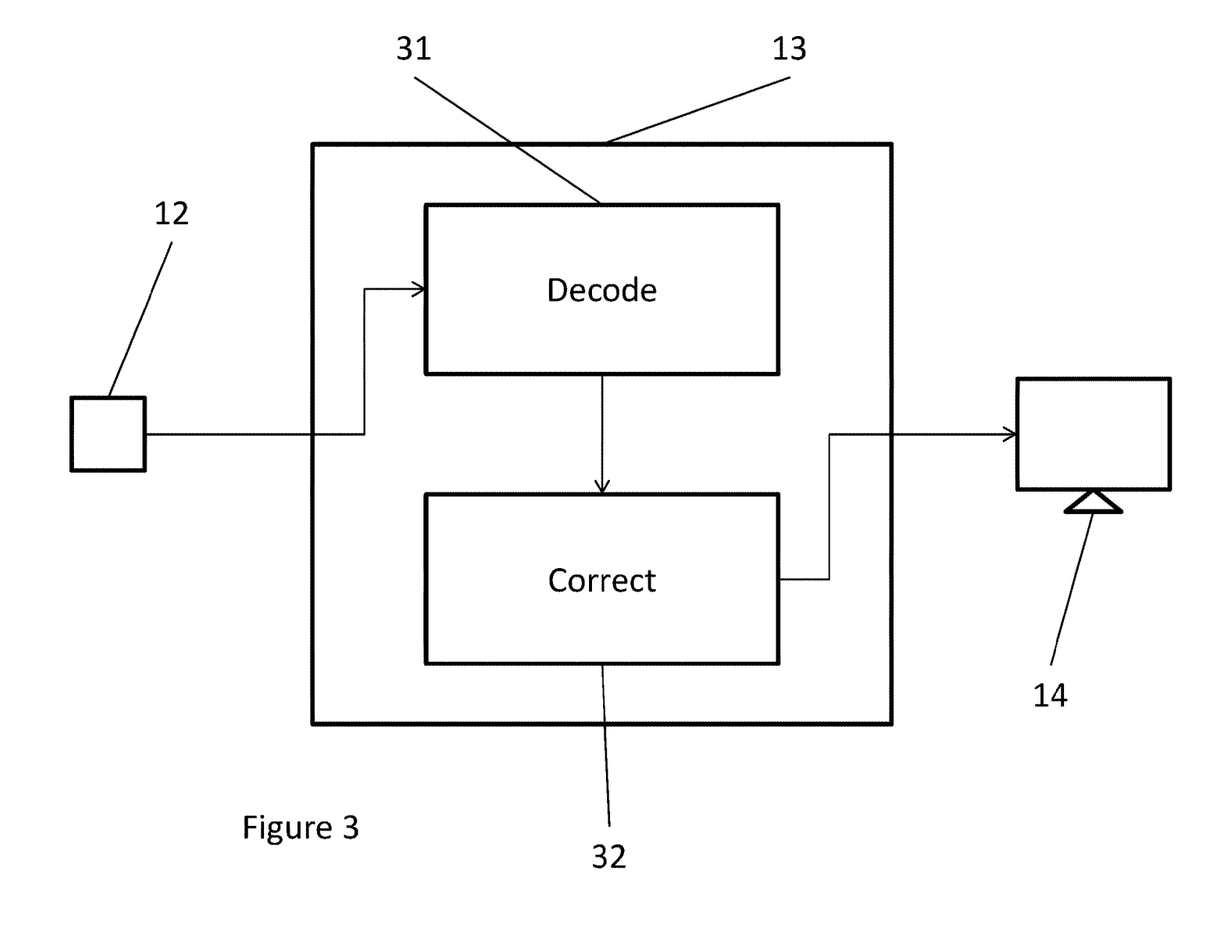
FIG. 3 is a simplified schematic of a display control device.

FIG. 3 shows a detail of the display control device [13], including its connections to the USB connection [12] and the display device [14]. The display control device [13] includes two relevant components [31, 32], which, as for the processing components [21, 22, 23] on the host [11], may be embodied as software, firmware, hardware, etc. in any appropriate combination.

The first processing component [31] is a decoder. This receives encoded data from the USB connection [12] and decodes it as appropriate, possibly including decryption and decompression. This generates luma, chroma, and error correction values as previously described, which the decoder [31] is then able to pass on to the second processing component, which is a correction engine [32]. This applies a correction algorithm using the error correction information sent as metadata to recreate the original RGB data from the luma and chroma values. It then passes the resulting pixel to the display device [14] for display.

If the feedback [15] from the USB connection [12] is passed to the display control device [13] as well as the host [11], it will be received by the correction engine [32] which may have a collection of predetermined algorithms available and be able to select and use these depending on the input, in order to reverse the processing carried out on the host [11].

There may be further components such as memory, composition engines, and/or an output engine between the correction engine [32] and the display device [14], but these are immaterial to the invention and will operate in the conventional way. They are therefore not shown.

Figure 4:
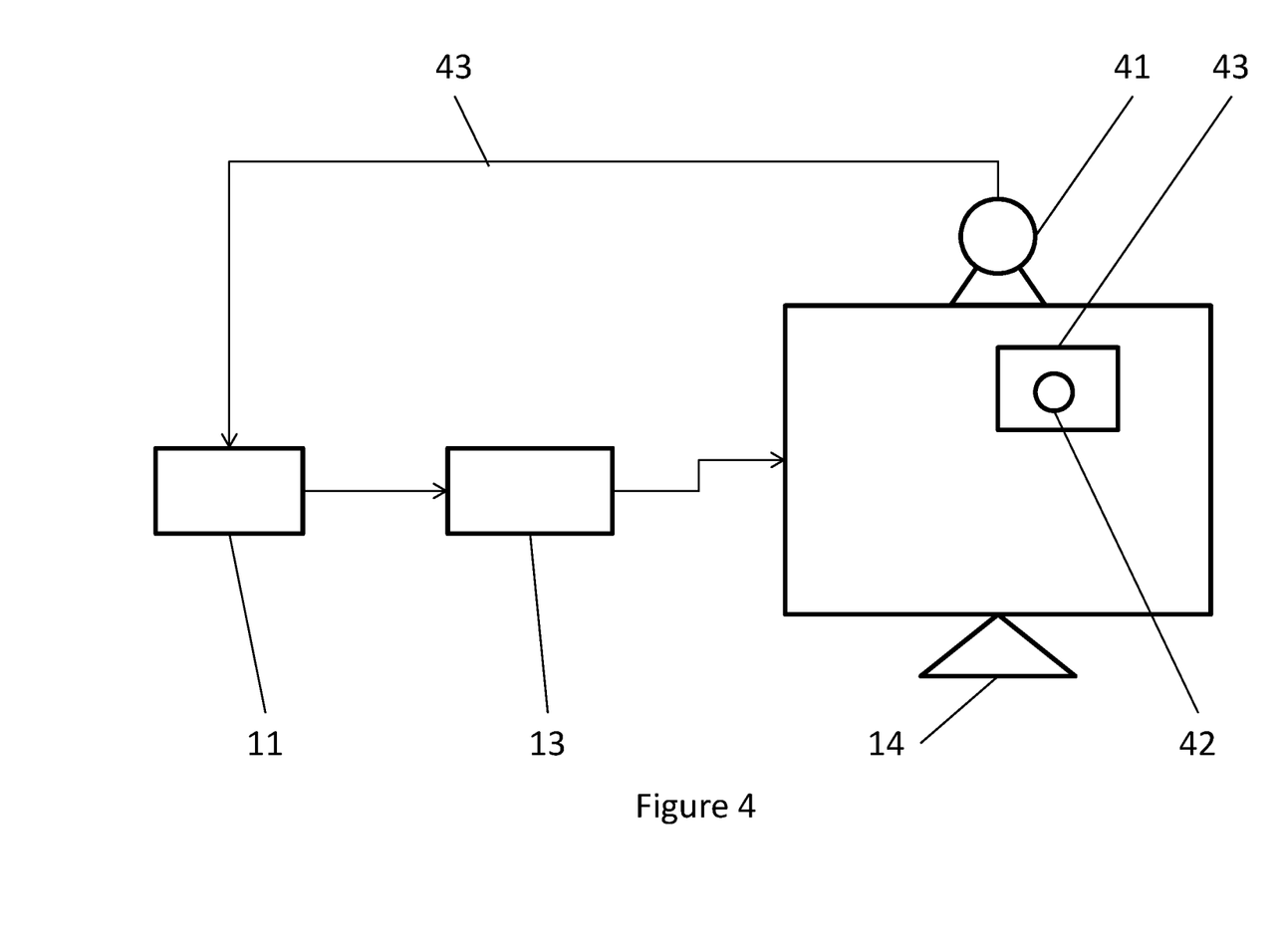
FIG. 4 is a diagram of system according to a second embodiment of the invention.

FIG. 4 shows an alternative embodiment of the system comprising a similar host [11], display control device [13], and display device [14] to those shown in FIGS. 1, 2, and 3. However, in this embodiment the feedback [43] that controls the conversion unit [22] on the host [11] comes not from the connection between the host [11] and the display control device [13] but from a camera [41] attached to the display device [14]. The camera [41] (there may be more than one in order to carry out this function more accurately, but their signals are combined to form a single indication and they can therefore be treated as a single camera [41]) detects the location of the user's focus [42] on the display device [14] by the direction of focus of his or her eyes. It then passes this information back to the host [11] where it can be used to weight different areas of the frame being produced differently during conversion to luma and chroma. This weighted data, together with the weighting as metadata, will then be transmitted to the display control device [13] as previously described.

FIG. 4 further shows an area [43] around the user's point of focus [42] which may be the actual area relevant to the methods of the invention. This is useful because if only the user's point of focus [42] were used this might lead to only a very small area being displayed with its colour values at full resolution, and therefore the distinction between the point of focus [42] and the rest of the frame would not be useful.

In an example alternative embodiment where the data is not converted to luma and chroma but is sent in RGB format with reductions in the resolution of one or more of the colours—for example clipping an eight-bit value to four bits—there will be no conversion process to luma and chroma, but the selection of the colour value to be clipped may be dictated by the feedback as to where the user is focussed: for example, the system may clip the B value in the periphery of the user's vision.

Because in this embodiment the weighting will change depending on the location of the data in the frame, it may be appropriate to divide the frame into tiles—rectangular groups of two or more pixels—rather than processing the data frame by frame. This means that embodiments of the invention can be applied at a finer granularity, allowing different areas of the same frame to have different colour resolutions. Such alterations in weighting from tile to tile may also be used in an embodiment such as that shown in FIG. 1 where, for example, part of a displayed image is moving rapidly while the rest remains static. In this case, it may be appropriate to apply an embodiment of the invention to the moving area of the image only. This could, for example, be done using a system such as that shown in FIG. 5.

Figure 5:
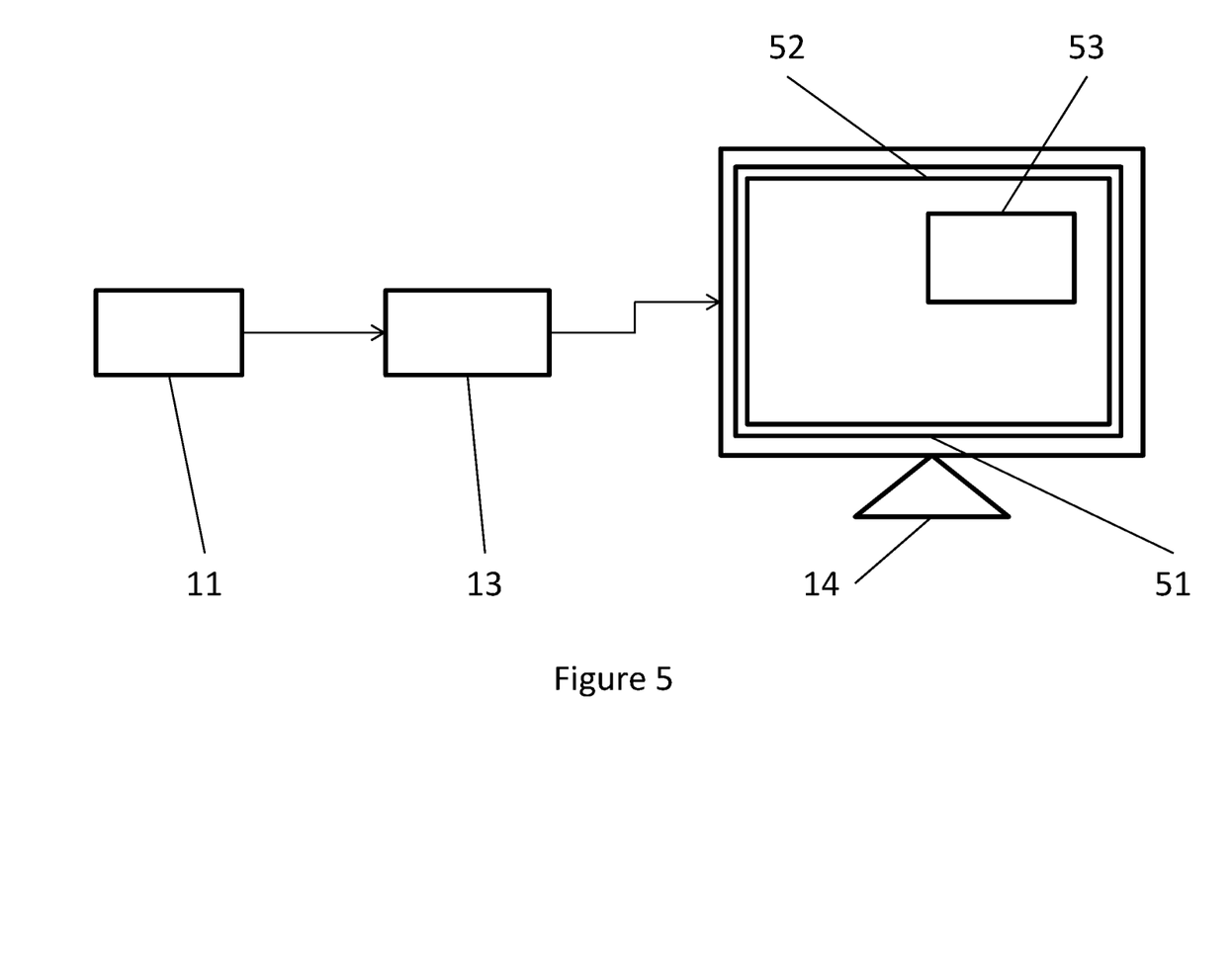
FIG. 5 is a diagram showing an area of a frame that is moving while the rest of the frame remains static.

FIG. 5 shows an embodiment of the system in which the displayed image [51] comprises a static area [52] and a moving area [53]. This might, for example, be a browser page [51] with an area of text [52] and a video [53]. The image [51] is shown on the display device [14], which is connected to the display control device [13] and in turn to the host [11], as previously described.

The host [11] is as described in FIG. 2, but during the conversion process, as well as converting the data from one colour space to another if appropriate, the conversion engine [22] senses motion in the part of the image [51] comprising the video [53]. This may be done by detecting differences from a previous frame, or the conversion engine [22] may be notified of the changes by the graphical generator [21]. In any case, the conversion engine [22] is aware of which parts of the image [51] are moving. It can use this information to select tiles that can have their blue colour resolution reduced. It may then reduce the blue colour resolution of all moving tiles to a uniform degree or to a greater or lesser degree depending on the degree of sensed movement.

Error correction information can then be generated per tile and transmitted to the display control device [13] to be used in correction, as previously described.

Figure 6:
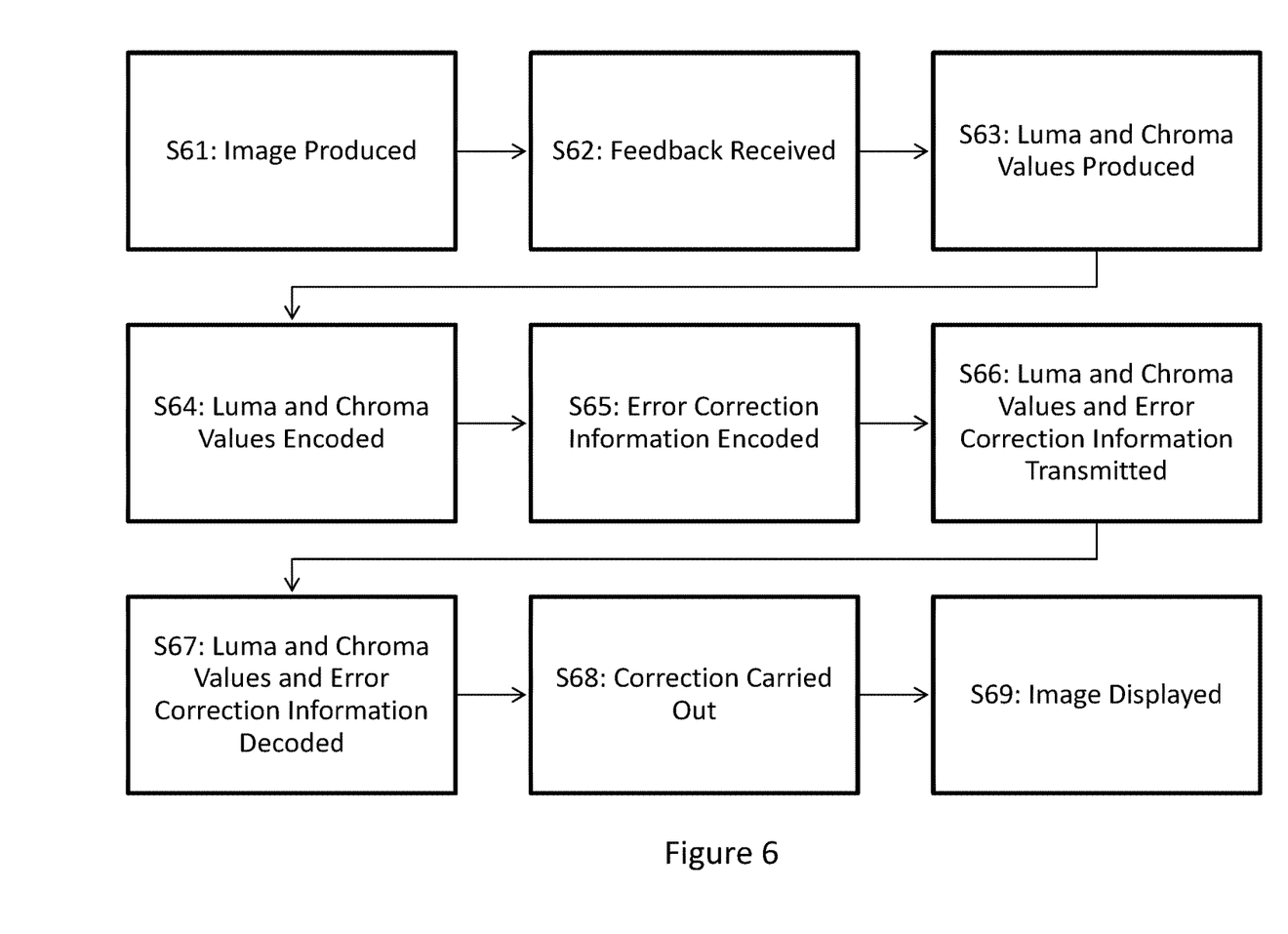
FIG. 6 shows a flowchart of the overall method used in embodiments of the invention.
Figure 7:
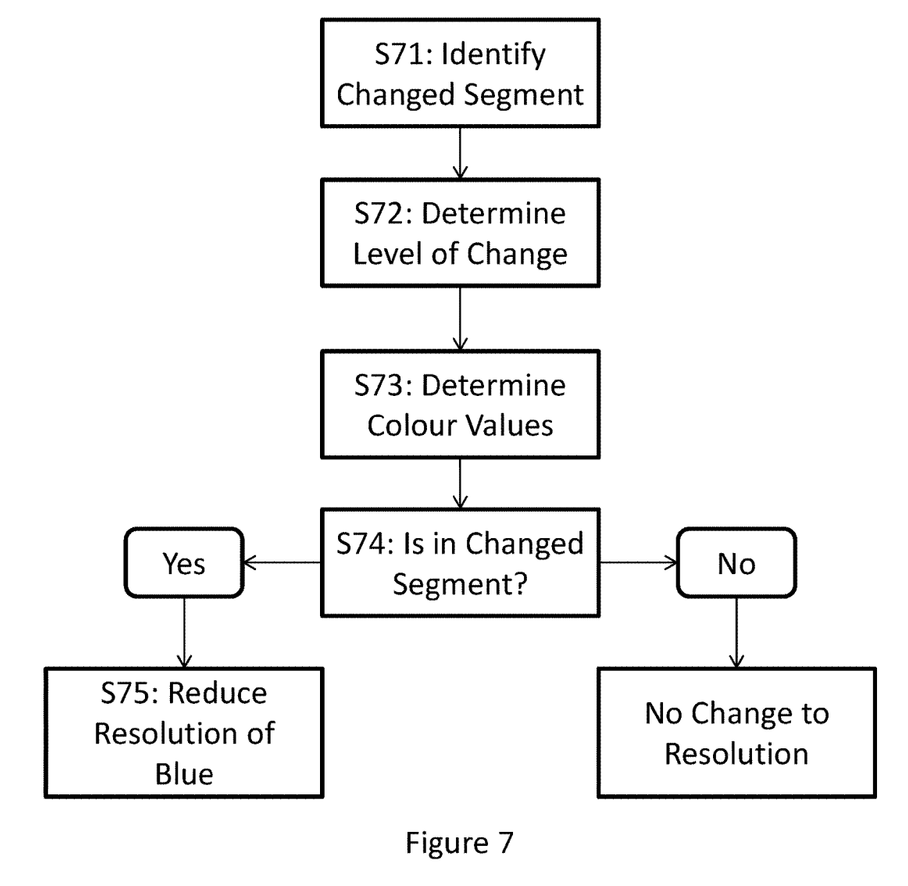
FIGS. 7 and 8 are flowcharts of variations to the method of FIG. 6.
Figure 8:
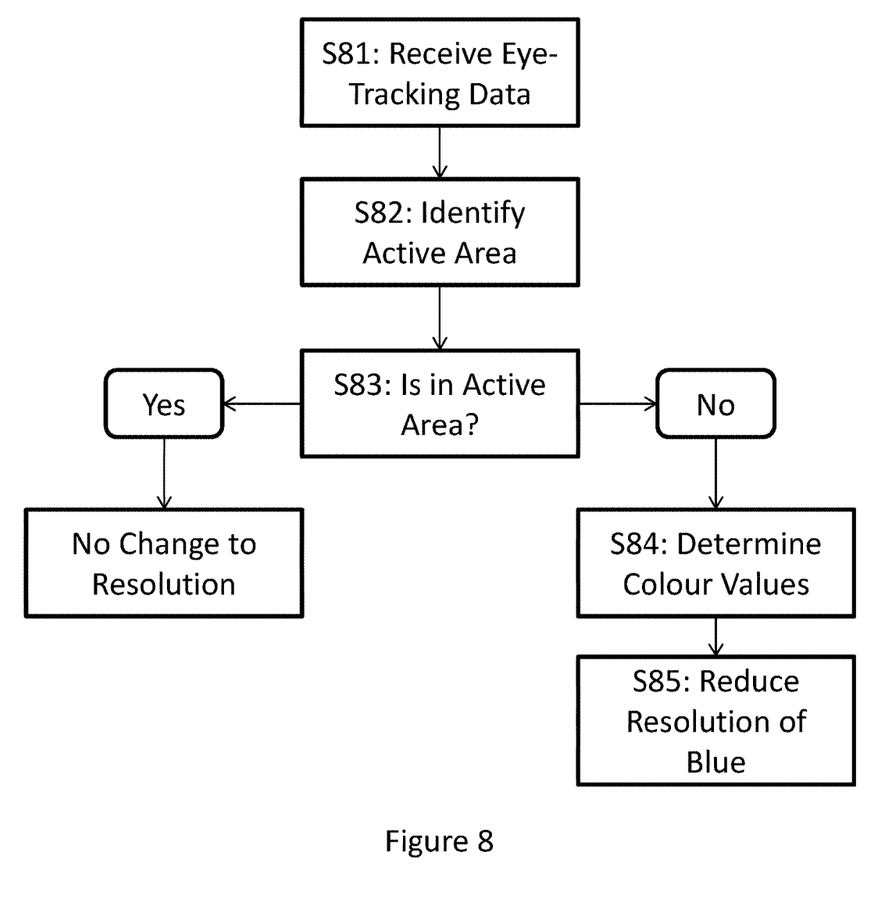

FIG. 6 shows the process of production, encoding, and transmission of a single frame, which is followed by the system in all these embodiments, albeit with differences in the nature of feedback and the details of application of the methods of the invention, as described by way of example in FIGS. 7 and 8. These figures show variations on the basic overall process shown in FIG. 6 and deviate from it with regard to Steps S62 and S63. Otherwise, the method is the same.

At Step S61, the frame to be displayed on the display device [14] is generated on the host [11]. As previously described, this will occur in the graphical generator [21] and the resulting frame is passed to the conversion engine [22]. Frames are generated at a frame rate, which is the rate at which the display device [14] is updated. It is likely that the image displayed in each frame will be different from the preceding frames, especially when the frames are part of a moving image. Depending on the image being displayed, the frame rate may vary, such that, for example, a fast-moving image may have a higher frame rate than a static image.

At Step S62, the conversion engine [22] determines the colour values for each pixel in the frame and receives feedback which will allow it to adjust the weighting it applies to the colour values according to heuristics which are likely to be pre-programmed. Examples of such heuristics include:

Uniformly reducing the resolution of the blue component across the whole of the image;

Reducing the resolution of the blue component only in fast-moving segments of the image (details of this process are described in FIG. 7).

Reducing the resolution of the blue component only in parts of the image that the viewer is not focussed on (details of this process are described in FIG. 8).

The heuristics are not mutually exclusive and one heuristic and the details of its accompanying method may be applied to areas of a frame in which the invention is used according to a different heuristic. For example, where one area of a frame is rapidly moving and a user is focussed on that area of the frame, the resolution of the blue component may be reduced in the fast-moving area according to the second heuristic and also in areas on which the user is not focussed according to the third heuristic, or if the user is focussed on a non-moving part of the frame the resolution of the blue component may be reduced in the fast-moving area according to the second heuristic and then further reduced according to the third heuristic.

In all cases, the reduction in resolution of the blue component can be made in an area where it is less likely to be noticed by a user, i.e. in an area that is not being focussed on or in a (fast-) moving area. The amount of reduction of the resolution of the blue component can, of course be predetermined and may be fixed so that the resolution changes dynamically but by a fixed amount, or the amount of reduction may be based on the rate of movement, e.g. based on the frame rate or available bandwidth (or other parameter) or on the sensed amount of change between segments, or on the distance from the centre of focus of a viewer.

Any one or more of these heuristics may be applied on a frame-by-frame basis, possibly according to changing feedback regarding changing capabilities of the host [11] and the transmission mechanism [12], such as frame rate, processor utilisation, bus bandwidth, and spare flow buffer capacity. There may also be a quality-of-service threshold such that an appropriate heuristic may only be applied when the quality of the transmission reaches a predetermined point. For example, the resolution of blue may be reduced when the frame rate as determined through the feedback [15] rises above a particular comparison rate. There may also be multiple thresholds and different heuristics are applied or the same heuristic is applied to different degrees depending on which threshold has been exceeded.

If appropriate, conversion may occur on a tile-by-tile basis with heuristics for determining the amount of reduction in resolution of the blue component used on individual tiles. A specific heuristic may be determined for an entire frame but have different results from tile to tile, for example in systems such as those described with reference to FIGS. 7 and 8.

In this case, the method will be applied across the entire frame, but the actual weighting applied from tile to tile may be different.

Whichever method or combination of methods is used, the result will be lower resolution of blue in the chroma values produced at Step S63. It may also affect the luma values produced at this stage, depending on the exact heuristic used, but this is not affected by correction and therefore is handled through a different mechanism. At this stage, the conversion engine [22] also produces error correction information for later use in correction, in this case comprising the weightings applied to each colour value. This is necessary due to the dynamic and therefore unpredictable nature of the conversion process and this information will be transmitted as metadata.

In an alternative embodiment where a different colour space is used, there may be similar heuristics, but the conversion process will obviously be different. For example, where the colour values are sent as RGB values with one of the colour values clipped to a smaller volume of data, this will occur in the conversion engine [22] at Step S63.

In a first embodiment in which the pixels are transmitted in the RGB format in which they were originally produced, each of the R, G, and B values is conventionally 8 bits long, allowing a resolution of 256, i.e. 256 shades of each component. The resolution of the blue component may be reduced by reducing the number of bits carrying the blue component. For example, a pixel is created which is a shade of light purple with the following values (in decimal and binary):

R: 185=1011 1001
G: 76=0100 1100
B: 225=1110 0001

The resolution of the B value may be reduced by cropping it to only four bits, i.e. converting its binary value to 1110. This may then be corrected by adding four bits during correction to return it to 1110 0000, which equals 224 in decimal. This is the same value as would be produced for any blue value between 224 and 239, and thus the detail of similar shades of light purple is lost. However, it is unlikely that the user will notice.

In this embodiment, the error correction information may be the number of bits which have been cropped, i.e. 4.

The number of bits to be cropped could be selected by, for example, a system of thresholds such that if there is a high level of space available in a flow buffer, two bits are cropped, if there is a medium level of space available four bits are cropped, and if there is a low level of space available six bits are cropped.

In a second embodiment, in which the pixel produced is converted to a luma and chroma colour space, the following formulae are used:

$$\alpha = aR + bG + cB$$

$$\beta = a'R + b'G + c'B$$

Conventionally, as previously mentioned, a=0, b=1, c=1 and a'=1, b'=1, c'=0. However, in this example c is a measure of performance, such as the percentage of the maximum connection bandwidth which is available for the data to be transmitted. For example, if 40% of the maximum bandwidth is available, c=0.4. Multiplying the B value by this smaller multiplier will result in a smaller a value and therefore an increase in compression. The B value can then be corrected by dividing by 0.4, but some detail will have been lost.

In this embodiment, the error correction information may be the multiplier used, i.e. 0.4.

At Step S64, the luma and chroma values are passed to the encoder [23]. This then encodes the values as appropriate, which may include compression and encryption. The same occurs with the error correction information at Step S55. These steps may also occur together, but in either case it is important that the error correction information is linked to and transmitted with the appropriate luma and chroma values in some way in order to ensure that correction is correctly performed, given that the changes in resolution required and applied during conversion may change rapidly, depending on the nature of the feedback used.

At Step S66, the encoded data is then transmitted across the appropriate medium: in FIG. 1, the USB connection [12]. In that embodiment, the USB connection [12] will then provide appropriate feedback to the conversion engine [22] as previously described, entering the process at Step S62 with regard to a later set of image data.

At Step S67, the encoded data is received by the decoder [31] on the display control device [13]. It is then decoded and may be decrypted and/or decompressed as previously described. The resulting luma and chroma values and the associated error correction information are then passed to the correction engine [32]. Here, at Step S68, the luma and chroma values are separated out into RGB pixel data and the colours corrected. Because this uses the error correction information provided by the original conversion engine [22], it is able to closely recreate the original colours despite the different weighting applied and it is highly unlikely that the user will notice the loss of resolution.

Finally, at Step S69, the pixel data is passed to the display device [14] and displayed in the conventional way.

When subsequent frames are converted, encoded, and transmitted, different weightings can be applied according to feedback, up to and including no reduction in the resolution of any colour. This will allow the image to be 'healed' as it returns to full quality when possible.

As mentioned, the technique could also be used in other colour spaces and even without any conversion to another colour space. However, it is beneficial to use a transform as in a second colour space it is easier to identify similarities in colours that can be compressed by loss of resolution.

For example, if the display data is transmitted as RGB without any conversion to luma and chroma, there will be no conversion process with multipliers as shown in the Background. Resolution can therefore be reduced by another process at the same point in the process such as by, as mentioned, reducing the number of bits used to store a particular colour value. The number of bits used and which colour value or values are affected can be changed dynamically in the same way as the weighting of the RGB values in the creation of luma and chroma.

FIG. 7 shows a variation of the process shown in FIG. 6 in which the resolution of a blue component of the colour values is not reduced across an entire frame but only in a section of the frame which has changed relative to a previous frame (the 'Changed Segment'), as described with reference to FIG. 5. These steps replace and elaborate on Steps S62 and S63.

At Step S71, an image having already been produced as previously described, the Changed Segment [53] is identified. This is similar to the receipt of feedback as described at Step S62, in that it indicates to the conversion engine [22] whether it should apply the methods of the invention and to what degree.

In an embodiment, information identifying the Changed Segment [53] may be provided by the operating system; in a second embodiment the host [11] identifies the Changed Segment [53] by comparing the data comprising the new frame [51] with a previous frame. This may be performed in the GPU [21].

The host [11] may identify a specific area to be treated as the Changed Segment [53] even where other areas have also changed using heuristics such as:
1. identifying the degree to which each area has changed and comparing it to a threshold level, grouping all areas that have changed to a sufficient degree together into a single Changed Segment [53];
2. comparing each area of change to other areas of change followed by treating the area that has changed to the greatest degree as the Changed Segment [53]; and/or
3. comparing each area of change to other areas of change followed by treating the largest continuous area of change as the Changed Segment [53].

Alternatively, there may be multiple Changed Segments [53]. However, for simplicity, only one is shown and described in this embodiment.

In this embodiment, at S72 the host [11] determines the level of change in the Changed Segment [53]. This may also be determined by the operating system and notified to the GPU [21] on the host [11], or it may be determined when the current frame [51] is compared to the previous frame. This information may then be used in determining the degree to which the resolution of a blue segment of the colour values should be reduced.

Level of change may be determined on a tile-by-tile basis or as an average across the whole of the Changed Segment [53].

In another embodiment, this step may not be used and the resolution of the blue component may be reduced to the same degree regardless of the level of change between frames.

At Step S73, the conversion engine [22] receives information regarding the Changed Segment [53] as well as image data from the graphical generator [21]. It then determines the colour values of each pixel, according to the colour space conversion being used. This may involve, for example, simply identifying the parts of each pixel value referring to red, green, and blue, or it may involve performing an arithmetic operation on the values. In any case, the conversion engine [22] then continues based on whether or not each pixel is part of the Changed Segment [53].

At Step S74, the conversion engine [22] determines whether or not an individual pixel is part of the Changed Segment [53]. The pixel may be part of a tile which is identified, for example with a flag from the GPU [21], as being part of the Changed Segment [53], or either the pixel or a tile of which it is part may have associated location information that the conversion engine [22] can compare to the location of the Changed Segment [53].

If the pixel is not part of the Changed Segment [53] but is part of the remainder of the frame [52], the conversion engine [22] continues in the conventional way and does not make any change to the resolution of any colour value, unless there is another heuristic in use as described above. The process continues as described in FIG. 6, from Step S64.

If the pixel is part of the Changed Segment [53], the process continues at Step S75: the conversion engine [22] reduces the resolution of the blue component as previously described. If information indicating the level of change is available, it may use this to determine the degree to which the resolution of the blue component should be reduced, since if the level of change is greater than the image is moving at a greater rate. This means that not only is the user less likely to notice a decrease in colour resolution, but a greater amount of data is being transmitted and, as a result, an increase in compression will be more beneficial.

The process then continues as described in FIG. 6, from Step S64.

This is an example of the use of tiles as a unit of display data as opposed to whole frames: the same method is applied to the whole frame, but it may have different results for different tiles as tiles within the Changed Segment may have different relative resolutions of colour balance—most likely decreased resolution of blue components compared to resolutions of red and green—compared to other tiles in the same frame, which are most likely to have the same resolution of blue compared to the resolution of red and green in this area. In an elaboration of this heuristic, the colours may be adjusted to different degrees as the amount of movement, or difference compared to a previous frame, increases.

FIG. 8 shows a variation of the process shown in FIG. 6 in which the resolution of a blue component of the colour values is performed across an entire frame with the exception of an area of the frame on which a user is focussed (the 'Active Area'), as described with reference to FIG. 4. These steps replace and elaborate on Steps S62 and S63.

At Step S81, a frame has already been generated as previously described, and the conversion engine [22] receives eye-tracking data. In the embodiment shown in FIG. 4, this is provided by the camera [41] and it is similar to the receipt of feedback as described at Step S62, in that it indicates to the conversion engine [22] whether it should apply the methods of the invention and to what degree. The eye-tracking data indicates to the conversion engine [22] where the user is focussed [42] on the image displayed on the display device [14] and enables it to identify the Active Area [43]. This occurs at Step S82.

The actual identification and sizing of the Active Area [43] may occur according to heuristics. It is likely that the Active Area [43] will be of a fixed size which is pre-programmed into the conversion engine [22], but it may be varied according to, for example, the type of image data being processed, or the capabilities of the connection, or the capabilities of the host. It may be determined as an area centring on the point of focus [42], as shown in FIG. 4, or it may be determined based on information regarding movement of the user's focus such that the point of focus [42] is at the side of the Active Area [43], meaning that if the user's focus continues to move in a predictable manner it will remain on the Active Area [43] for the maximum period of time.

In any case, once the Active Area [43] has been identified, the conversion engine [22] is able to determine whether each tile, or possibly but less likely each pixel, is in the Active Area [43] at Step S83. It may do this using knowledge of the location of the tile, combined with knowledge of the location of the Active Area [43].

If the tile is in the Active Area [43], the conversion engine [22] does not make any change to the resolution of the blue components of the colour values of any pixel in it relative to the red and green components, unless there is another heuristic in use as described above. The process continues as described in FIG. 6 from Step S64.

If the tile is not in the Active Area [43], this means that it is away from the user's point of focus [42] and the user is less likely to notice a reduction in the resolution of the blue component of the colour values. These are determined at Step S84. As previously described, this may involve conversion to another colour space or simply identifying the parts of the pixel data referring to each colour component.

At Step S85, the resolution of the blue component of each pixel in the tile is reduced as previously described. It may be reduced to a varying extent, according to feedback received regarding the capabilities of the host [11] or the connection between the host [11] and the display control device [13], or even according to the distance of each pixel or, more likely, tile from the user's point of focus [42] such that the further a tile is from the point of focus [42] the greater the reduction in the resolution of the blue component of pixels in that tile.

The process then continues as described in FIG. 6 from Step S64.

This is a further example of the use of tiles as a unit of display data as opposed to whole frames: tiles outside the area of the user's focus may have different relative resolutions of colour balance—most likely decreased resolution of blue components compared to resolutions of red and green—compared to tiles in the area of focus of the user, which are most likely to have the same resolution of blue compared to the resolution of red and green in this area. In an elaboration of this heuristic, the colours may be adjusted to different degrees as distance from the point of the user's focus increases, such that the resolution of blue will be at a maximum degree at the point of focus, a medium degree a certain number of tiles away, and a minimum degree a further number of tiles away.

FIGS. 7 and 8 show a difference in the point in the process at which the colour values are determined due to the fact that the method of FIG. 7 is applied on a pixel-by pixel basis across the entire frame [51], since there may be more than one Changed Segment [53] and the method of FIG. 8 is applied on a tile-by-tile basis outside the Active Area [43], since there will be only one Active Area [43].

The ordering shown in FIG. 7 is also most appropriate where the reduction in resolution of the blue component is applied separately from this process, for example where the colour values were produced in RGB format and will be converted to another colour space; this is a process that must be performed for every pixel, and therefore it is useful to determine the colour values at this stage.

The ordering shown in FIG. 8 is more appropriate where the reduction in resolution of the blue component is to be reduced as part of the determination of the colour values, for example where the colour values were produced in RGB format and will not be converted to another colour space, and therefore the colour values need only be separately determined where the details of one value will be altered.

The point at which the colour values are determined may therefore change in different embodiments, such that in a system such as that shown in FIG. 5 the colour values may be determined only for the pixels in the Changed Segment [53], and in a system such as that shown in FIG. 4 the colour values may be determined for all pixels, as opposed to what is described in FIGS. 7 and 8.

It will be appreciated that although only a few particular embodiments of the invention have been described in detail, various modifications and improvements can be made by a person skilled in the art without departing from the scope of the present invention, as defined by the attached claims. For example, the resolution of the blue component could be reduced, where desirable, by using a interpolated value based on blue component values of adjacent, or adjacent to some distance, pixels, or, if there are larger areas of the same or similar blue gradations, information could simply be sent that all the pixels in that area or areas have the same level of blue. It will be apparent that a number of different ways can be used to reduce the resolution of the blue component of the colour space. The amount of quantisation, or number of levels of blue gradation, is decreased in areas where they are less likely to be noticed, perhaps by an amount based on the likelihood of being noticed, so that less information need be transmitted, leading to higher compression.

The invention claimed is:

1. A method of compressing image data at a host device and transmitting the compressed image data to a display control device over a bandwidth limited connection, the method comprising:
   receiving a plurality of frames of image data, at least part of which changes from frame to frame at a frame rate to provide a moving image;
   dynamically determining a value of available bandwidth on the bandwidth limited connection between the host device and the display control device; and
   for a frame of image data:
      determining colour values in a colour space for each pixel in the frame;

determining at least one segment of the image data that has changed from a previous frame to form at least part of the moving image;

dynamically reducing a resolution of a blue component of the colour values relative to resolutions of green and red components of the colour values for each pixel in the determined at least one segment, wherein an amount of reduction of the resolution of the blue component is based on the value of available bandwidth, wherein the amount of reduction of the resolution of the blue component is based on the amount of change of the image data in the at least one segment, wherein the amount of change is compared to one or more thresholds and the resolution of the blue component is reduced by one or more amounts based on whether the amount of change exceeds one or more particular thresholds; and transmitting the image data having the reduced resolution blue component, together with error correction information indicating how to correct the blue component for each pixel when the image data is displayed.

2. The method according to claim 1, further comprising determining a value of any one or more of a processor load, a processor temperature or an available battery power, and wherein an amount of reduction of the resolution of the blue component for each of the one or more pixels is further based on the determined value.

3. The method according to claim 1, wherein reducing the resolution of the blue component for each of the one or more pixels comprises dynamically selecting a reduction factor and reducing the resolution of the blue component based on the reduction factor, wherein the error correction information includes the reduction factor.

4. The method according to claim 1, wherein reducing the resolution of the blue component comprises reducing a number of levels of blue gradations of the blue component for each of the one or more pixels.

5. The method according to claim 1, wherein dynamically reducing the resolution of the blue component for each of the one or more pixels comprises altering weighting factors for each colour value in the colour space, wherein altering weighting factors comprises weighting the colour value of the blue component to reduce the blue component relative to the red and green components so that it requires fewer bits compared to the red and green components.

6. A method of compressing image data at a host and transmitting the compressed image data to a display control device over a bandwidth limited connection, the method comprising:

determining an active area of an image comprising a plurality of tiles of image data, the active area being less than the whole of the image and being an area on which a user is focussed;

dynamically determining a value of available bandwidth on the bandwidth limited connection between the host device and the display control device; and for at least one tile of image data not in the active area:
determining colour values in a colour space for one or more pixels in the tile;

dynamically reducing a resolution of a blue component of the colour values relative to resolutions of green and red components of the colour values for each of the one or more pixels, wherein an amount of reduction of the resolution of the blue component is based on the value of available bandwidth, wherein the amount of reduction of the resolution of the blue component for each of the one or more pixels is based on the distance of the tile from the active area, wherein the distance is compared to one or more thresholds and the resolution of the blue component for each of the one or more pixels is reduced by one or more amounts based on whether the distance exceeds one or more particular thresholds; and transmitting the image data having the reduced resolution blue component, together with error correction information indicating how to restore the blue component for each of the one or more pixels for the tile when the image data is displayed.

7. The method according to claim 6, wherein the active area is determined by sensing a direction of focus of an eye of the user.

8. The method according to claim 6, further comprising determining a value of any one or more of a processor load, a processor temperature or an available battery power, and wherein an amount of reduction of the resolution of the blue component for each of the one or more pixels is based on the determined value.

9. The method according to claim 6, wherein reducing the resolution of the blue component for each of the one or more pixels comprises dynamically selecting a reduction factor and reducing the resolution of the blue component based on the reduction factor, wherein the error correction information includes the reduction factor.

10. The method according to claim 6, wherein reducing the resolution of the blue component comprises reducing a number of levels of blue gradations of the blue component for each of the one or more pixels.

11. The method according to claim 6, wherein dynamically reducing the resolution of the blue component for each of the one or more pixels comprises altering weighting factors for each colour value in the colour space, wherein altering weighting factors comprises weighting the colour value of the blue component to reduce the blue component relative to the red and green components so that the blue component requires fewer bits compared to the red and green components.

12. An apparatus comprising a host device for compressing image data to be transmitted over a bandwidth limited connection to a display control device, wherein the host device comprises:

a graphical generator for generating image data comprising a plurality of frames of image data, at least part of which changes from frame to frame at a frame rate to provide a moving image; and a conversion unit configured to receive the image data from the graphical generator, and feedback indicating available bandwidth on the bandwidth limited connection between the host and the display control device, wherein the conversion unit is further configured to dynamically determine a value of available bandwidth from the feedback and, for a frame of image data:

determine colour values in a colour space for one or more pixels in the frame;

determine at least one segment of the image data that has changed from a previous frame to form at least part of the moving image;

dynamically reduce a resolution of a blue component of the colour values relative to resolutions of green and red components of the colour values for each pixel in the determined at least one segment, wherein an amount of reduction of the resolution of the blue component is based on the value of available bandwidth, wherein the amount of reduction of the resolution of the blue component is based on the amount of change of the image data in the at least one segment, wherein the amount of change is compared to one or more thresholds and the resolution of the blue component is reduced by one or more amounts based on whether the amount of change exceeds one or more particular thresholds;

wherein the image data having the reduced resolution blue component, together with error correction information indicating how to correct the blue component for each of the one or more pixels when the image data is displayed, is transmitted to the display control device over the bandwidth limited connection.

13. The apparatus of claim 12, wherein the conversion unit is further configured to determine a value of any one or more of a processor load, a processor temperature or an available battery power, and wherein an amount of reduction of the resolution of the blue component for each of the one or more pixels is further based on the determined value.

14. The apparatus of claim 12, wherein the conversion unit is further configured to dynamically select a reduction factor and reduce the resolution of the blue component based on the reduction factor, wherein the error correction information includes the reduction factor.

15. The apparatus of claim 12, wherein the conversion unit is further configured to reduce a number of levels of blue gradations of the blue component for each of the one or more pixels.

16. The apparatus of claim 12, wherein the conversion unit is further configured to alter Weighting factors for each colour value in the colour space, wherein altering weighting factors comprises weighting the colour value of the blue component to reduce the blue component relative to the red and green components so that it requires fewer bits compared to the red and green components.

17. An apparatus comprising a host device for compressing image data to be transmitted over a bandwidth limited connection to a display control device for display on a display device, wherein the host device comprises:
a graphical generator for generating an image comprising a plurality of tiles of image data; and
a conversion unit configured to receive the image from the graphical generator, and feedback indicating a location of a user's focus on the display device, wherein the conversion unit is further configured to determine an active area of the image, the active area being less than the whole of the image and being an area on which the user is focussed, to dynamically determine a value of available bandwidth on the bandwidth limited connection between the host and the display control device, and, for at least one tile of image data not in the active area:
determine colour values in a colour space for one or more pixels in the tile; and
dynamically reduce a resolution of a blue component of the colour values relative to resolutions of green and red components of the colour values for each of the one or more pixels, wherein an amount of reduction of the resolution of the blue component is based on the value of available bandwidth, wherein the amount of reduction of the resolution of the blue component for each of the one or more pixels is based on the distance of the tile from the active area, wherein the distance is compared to one or more thresholds and the resolution of the blue component for each of the one or more pixels is reduced by one or more amounts based on whether the distance exceeds one or more particular thresholds;

wherein the image data having the reduced resolution blue component, together with error correction information indicating how to correct the blue component for each of the one or more pixels for the tile when the image data is displayed, is transmitted to the display control device over the bandwidth limited connection.

18. The apparatus of claim 17, wherein the conversion unit is further configured to determine a value of any one or more of a processor load, a processor temperature or an available battery power, and wherein an amount of reduction of the resolution of the blue component for each of the one or more pixels is further based on the determined value.

19. The apparatus of claim 17, wherein the conversion unit is further configured to dynamically select a reduction factor and reduce the resolution of the blue component based on the reduction factor, wherein the error correction information includes the reduction factor.

20. The apparatus of claim 17, wherein the conversion unit is further configured to reduce a number of levels of blue gradations of the blue component for each of the one or more pixels.

21. The apparatus of claim 17, wherein the conversion unit is further configured to alter weighting factors for each colour value in the colour space, wherein altering weighting factors comprises weighting the colour value of the blue component to reduce the blue component relative to the red and green components so that it requires fewer bits compared to the red and green components.

22. The apparatus of claim 17, further comprising a sensor configured to sense a direction of focus of an eye of the user.

* * * * *